US012629677B2

(12) United States Patent
Zhang et al.

(10) Patent No.: US 12,629,677 B2
(45) Date of Patent: May 19, 2026

(54) MICROFLUIDIC DEVICE

(71) Applicant: SHANGHAI TIANMA MICROELECTRONICS CO., LTD., Shanghai (CN)

(72) Inventors: Kaidi Zhang, Shanghai (CN); Baiquan Lin, Shanghai (CN); Kerui Xi, Shanghai (CN); Wei Li, Shanghai (CN); Yunfei Bai, Shanghai (CN); Ping Su, Shanghai (CN)

(73) Assignee: SHANGHAI TIANMA MICROELECTRONICS CO., LTD., Shanghai (CN)

( * ) Notice: Subject to any disclaimer, the term of this patent is extended or adjusted under 35 U.S.C. 154(b) by 102 days.

(21) Appl. No.: 18/013,564

(22) PCT Filed: Dec. 20, 2021

(86) PCT No.: PCT/CN2021/139639

§ 371 (c)(1),
(2) Date: Dec. 29, 2022

(87) PCT Pub. No.: WO2023/045142

PCT Pub. Date: Mar. 30, 2023

(65) Prior Publication Data

US 2024/0091766 A1 Mar. 21, 2024

(30) Foreign Application Priority Data

Sep. 24, 2021 (CN) .......................... 202111121736.0

(51) Int. Cl.
*B01L 3/00* (2006.01)

(52) U.S. Cl.
CPC . *B01L 3/502715* (2013.01); *B01L 2300/0645* (2013.01)

(58) Field of Classification Search
CPC ....... B01L 3/502715; B01L 2300/0645; B01L 2400/0427; B01L 3/502792; B01L 3/50273; B01L 2200/143; B01L 2300/047
(Continued)

(56) References Cited

FOREIGN PATENT DOCUMENTS

| | | | |
|---|---|---|---|
| CN | 107583694 | A | 1/2018 |
| CN | 108169966 | A | 6/2018 |

(Continued)

OTHER PUBLICATIONS

English Translation of CN 112934280 B, from Google Patents, Shanghai AVIC Optoelectronics Co Ltd., pp. 1-20, 2023. (Year: 2023).*

(Continued)

*Primary Examiner* — Christine T Mui
(74) *Attorney, Agent, or Firm* — KILPATRICK TOWNSEND & STOCKTON LLP

(57) ABSTRACT

A microfluidic device includes a first substrate and a second substrate disposed opposite to each other. A cavity is formed between the first substrate and the second substrate. The first substrate includes multiple drive electrodes and multiple first electrodes, and the drive electrodes are disposed on a side of the first electrodes facing the second substrate. At least one of the drive electrodes includes at least one opening, and the opening, along a direction perpendicular to a plane where the first substrate is located, penetrates the drive electrode where the opening is located. An orthographic projection of at least one first electrode on the plane covers an orthographic projection of one opening on the plane. The second substrate includes at least one second electrode, and an orthographic projection of the second electrode on the plane partially overlaps with an orthographic projection of the first electrode on the plane.

19 Claims, 7 Drawing Sheets

(58) Field of Classification Search
USPC .................................................. 422/502, 500
See application file for complete search history.

(56) References Cited

FOREIGN PATENT DOCUMENTS

| | | | |
|---|---|---|---|
| CN | 108593724 | A | 9/2018 |
| CN | 109174219 | A | 1/2019 |
| CN | 110787843 | A | 2/2020 |
| CN | 212341879 | U | 1/2021 |
| CN | 112445014 | A | 3/2021 |
| CN | 112934280 | A | 6/2021 |
| CN | 113769802 | A | 12/2021 |

OTHER PUBLICATIONS

English Translation of CN 109174219 B, from Google Patents, BOE Technology Group Co Ltd, pp. 1-14, 2019. (Year: 2019).*
ISA State Intellectual Property Office of the People's Republic of China, International Search Report Issued in Application No. PCT/CN2021/139639, Jun. 6, 2022, 11 pages.

* cited by examiner

MICROFLUIDIC DEVICE

CROSS-REFERENCE TO RELATED APPLICATION(S)

This is a national stage application filed under 37 U.S.C. 371 based on International Patent Application No. PCT/CN2021/139639, filed Dec. 20, 2021, which claims priority to Chinese Patent Application No. 202111121736.0 filed with the China National Intellectual Property Administration (CNIPA) on Sep. 24, 2021, the disclosures of which are incorporated herein by reference in their entireties.

FIELD

The present application relates to the field of microfluidic technologies, for example, a microfluidic device.

BACKGROUND

In the related art, generally, through a principle of electrowetting, at least one substrate voltage is set to control a flow position of the liquid in a microfluidic device. In a process of driving automatic movement of a droplet, the droplet size change and the residual droplet on the electrode occur, affecting the accuracy of the subsequent test. Therefore, in a process of the automatic movement of the liquid, the positions of the liquid and the residual droplet of the liquid need to be fed back in real time for precise control.

In the related art, drive electrodes are set completely, and when the droplet position detection is performed by a sensing electrode disposed on a side of the drive electrode, only the droplet at a specific position of the drive electrode can be detected. For example, only the droplet at least partially located in a gap between two adjacent drive electrodes can be detected and the droplet not at this position cannot be detected. In this manner, the detection accuracy is limited, and the droplet size and the small number of droplets remaining in an orthographic projection of the drive electrode cannot be measured.

SUMMARY

The present application provides a microfluidic device to improve the problem in the related art that a droplet size change and an accurate position of a droplet in an orthographic projection of an electrode surface cannot be detected.

The present application provides a microfluidic device. The microfluidic device includes a first substrate and a second substrate disposed opposite to each other, where a cavity is formed between the first substrate and the second substrate and configured to accommodate liquid.

The first substrate includes drive electrodes and first electrodes, drive electrodes are disposed on a side of first electrodes facing the second substrate, and drive electrodes are arranged in an array.

At least one of drive electrodes includes at least one opening, and the at least one opening, along a direction perpendicular to a plane where the first substrate is located, penetrates the at least one of drive electrodes where the at least one opening is located; and an orthographic projection of at least one of first electrodes on the plane where the first substrate is located covers at least an orthographic projection of one of the at least one opening on the plane where the first substrate is located.

The second substrate includes at least one second electrode, and an orthographic projection of the at least one second electrode on the plane where the first substrate is located at least partially overlaps with an orthographic projection of first electrodes on the plane where the first substrate is located.

DETAILED DESCRIPTION

Figure 1:
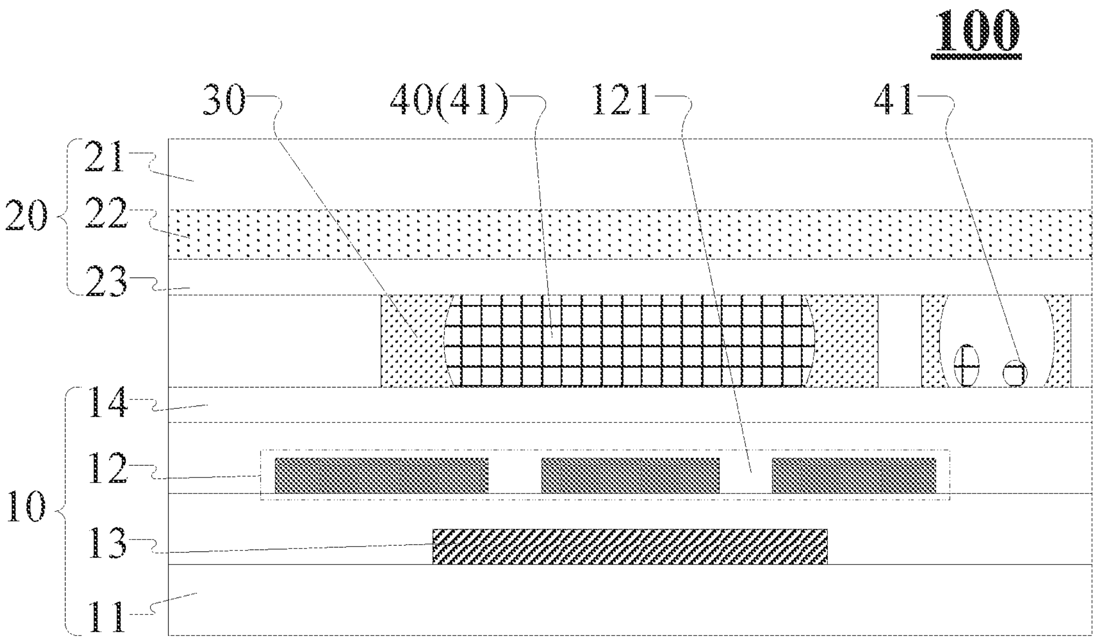
FIG. 1 is a partial sectional diagram of a microfluidic device according to an embodiment of the present application.

Various exemplary embodiments of the present application are described with reference to the drawings. Relative arrangements of components and steps, numerical expressions and numerical values set forth in these embodiments do not limit the scope of the present application unless otherwise indicated.

The following description of at least one exemplary embodiment is merely illustrative in nature and is in no way intended to limit the present application and the application or usages thereof.

The related art may not be discussed, but where appropriate, such techniques, methods, and devices should be considered part of the specification.

In all examples shown and discussed herein, any values should be construed as merely exemplary and not as limiting. Therefore, other examples of the exemplary embodiments may have different values.

Similar reference numerals and letters indicate similar items in the following drawings, once a particular item is defined in a drawing, the item does not need to be further discussed in subsequent drawings.

In the related art, drive electrodes are set completely, and when the droplet position detection is performed by a sensing electrode disposed on a side of the drive electrode, only the droplet at a specific position of the drive electrode can be detected. For example, only the droplet at least partially located in a gap between two adjacent drive electrodes can be detected and the droplet not at this position cannot be detected. In this manner, the detection accuracy is limited, and the droplet size and the small number of droplets remaining in an orthographic projection of the drive electrode cannot be measured.

The present application provides a microfluidic device to improve the problem in the related art that a droplet size change and an accurate position of a droplet in an orthographic projection of an electrode surface cannot be detected.

Figure 2:
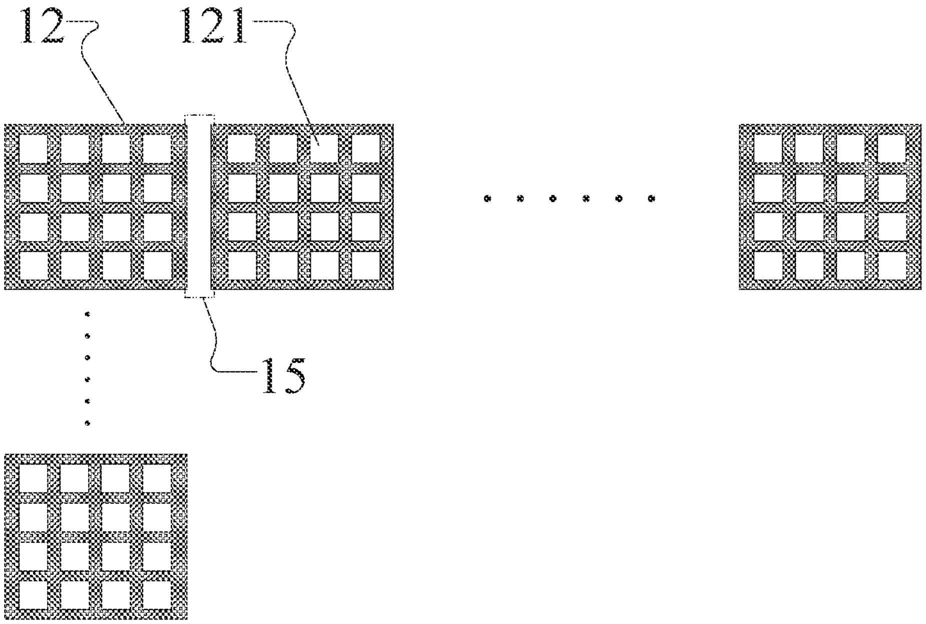
FIG. 2 is a top diagram of drive electrodes according to an embodiment of the present application.

FIG. 1 is a partial sectional diagram of a microfluidic device according to an embodiment of the present application. FIG. 2 is a top diagram of drive electrodes according to an embodiment of the present application. Referring to FIGS. 1 and 2, the present application provides a microfluidic device 100. The microfluidic device 100 includes a first substrate 10 and a second substrate 20 disposed opposite to each other. A cavity 30 is formed between the first substrate 10 and the second substrate 20 and configured to accommodate liquid 40. The first substrate 10 includes multiple drive electrodes 12 and multiple first electrodes 13, the multiple drive electrodes 12 are disposed on a side of the multiple first electrodes 13 facing the second substrate 20, and the multiple drive electrodes 12 are arranged in an array. At least one drive electrode 12 includes at least one opening 121, and the least one opening 121, along a direction perpendicular to a plane where the first substrate is located, penetrates the drive electrode 12 where the least one opening 121 is located. An orthographic projection of at least one first electrode 13 on the plane where the first substrate 10 is located covers at least an orthographic projection of one opening 121 on the plane where the first substrate 10 is located. The second substrate 20 includes at least one second electrode 22, and an orthographic projection of the second electrode 22 on the plane where the first substrate 10 is located at least partially overlaps with an orthographic projection of the first electrode 13 on the plane where the first substrate 10 is located.

To solve the detection of the position and size of a residual droplet 41 in the microfluidic device 100, the present application provides the microfluidic device 100. The microfluidic device 100 includes the first substrate 10 and the second substrate 20 disposed opposite to each other. The cavity 30 is formed between the first substrate 10 and the second substrate 20 and configured to accommodate the liquid 40 that can be driven to flow. The cavity 30 of the microfluidic device 100 is usually formed by at least one channel or further includes at least one branch channel. During a process of the liquid 40 flowing in the cavity 30, it is inevitable that some droplets 41 stay in some positions in the channel. In the present application, the position and size of the droplet 41 staying in the channel are detected through the design described below.

The sectional diagram of FIG. 1 only shows a schematic diagram of one drive electrode 12 and one first electrode 13 and is used for illustrating the microfluidic device 100 provided in the present application, but does not mean that the microfluidic device 100 includes only one drive electrode 12 and one first electrode 13.

The present application provides an arrangement of the first substrate 10 described below. The first substrate 10 may include multiple drive electrodes 12 and multiple first electrodes 13. The multiple drive electrodes 12 are disposed on a side of the multiple first electrodes 13 facing the second substrate 20, that is, the drive electrodes 12 are disposed on a side closer to the cavity 30 than the first electrodes 13. As shown in FIG. 2, in the case where the number of the drive electrodes 12 is relatively large, the multiple drive electrodes 12 may be arranged in an array; and voltage signals are applied to the drive electrodes 12 to drive the movement of the liquid 40 in the cavity 30. In the present application, openings 121 are disposed on some or all of the drive electrodes 12, and the openings 121 are formed by penetrating the drive electrodes 12 in the direction perpendicular to the plane where the first substrate 10 is located, that is, at least one through hole is opened on the drive electrode 12 to form at least one opening 121. At the same time, the orthographic projection of the first electrode 13 on the plane where the first substrate 10 is located can cover the orthographic projection of the opening 121 on the plane where the first substrate 10 is located.

The present application provides an arrangement of the second substrate 20 described below. The second substrate 20 includes at least one second electrode 22, and the orthographic projection of the second electrode 22 on the plane where the first substrate 10 is located at least partially overlaps with the orthographic projection of the first electrode 13 on the plane where the first substrate 10 is located. The cavity 30 accommodating the liquid 40 is disposed between the first electrode 13 and the second electrode 22. When a voltage signal is applied to the first electrode 13 and the second electrode 22, a capacitance is formed between the droplet 41 remaining in the cavity 30 and the first electrode 13 and connected to a capacitance formed between the droplet 41 and the second electrode 22; the capacitances and the changes of the capacitances between the first electrode 13 and the second electrode 22 are detected and whether the droplet 41 exists at this position may be determined and the size of the droplet 41 is detected at the same time. In the case where it is detected that the capacitance at one position is different from the capacitance of a region where no droplet 41 exists normally, it means that the residual droplet 41 exists in a region corresponding to the capacitance.

The present application does not limit the size of the drive electrodes 12, nor does the present application limit the number and size of the openings 121 on one drive electrode 12, as long as the openings 121 can be set and the capacitances are formed between the first electrode 13 and the second electrode 22 and used for detecting the size and position of the residual droplet 41 in the cavity 30. In the multiple drive electrodes 12 shown in FIG. 2, each drive electrode 12 includes sixteen openings 121 arranged in an array, which is only one embodiment provided in the present application and not used for limiting the set number, shape, and arrangement of the openings 121.

The first substrate 10 further includes a glass substrate 11, the first electrode 13 is formed on a surface of the glass substrate 11, and the first substrate 10 further includes a hydrophobic layer 14 disposed adjacent to the liquid 40; the second substrate 20 further includes a hydrophobic layer 23 and a glass cover plate 21 disposed opposite to each other, and the cavity 30 is disposed between the hydrophobic layer 14 and the hydrophobic layer 23 disposed opposite to each other and used for accommodating the liquid 40.

Figure 3:
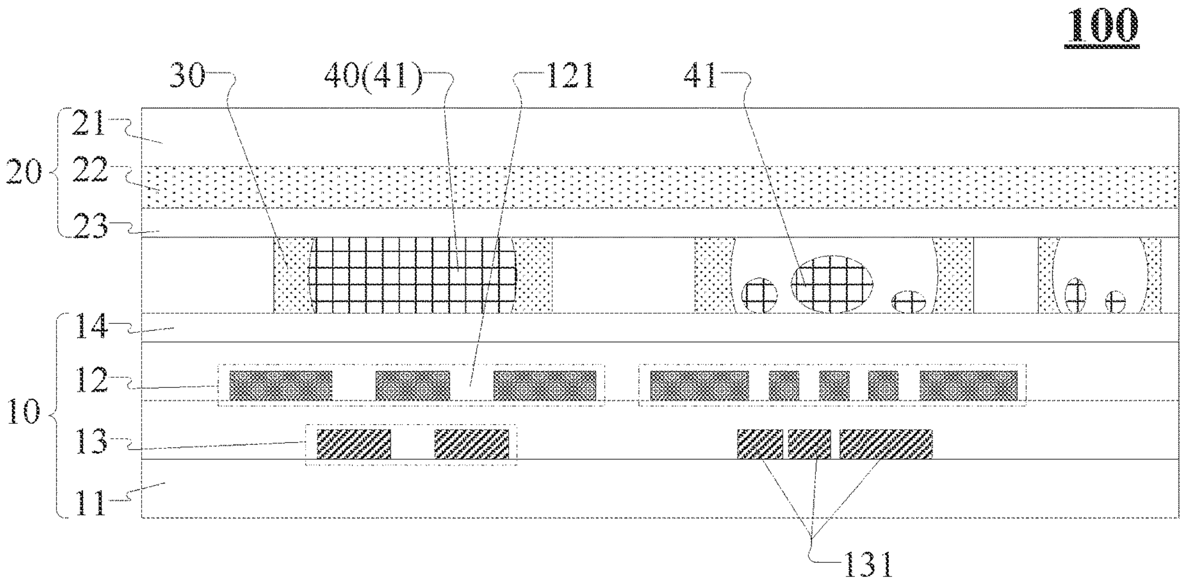
FIG. 3 is a partial sectional diagram of another microfluidic device according to an embodiment of the present application.

FIG. 3 is a partial sectional diagram of another microfluidic device according to an embodiment of the present application. Referring to FIG. 3, and the first electrode 13 includes multiple first sub-electrodes 131 arranged in the same layer.

In the case where the first electrode 13 disposed in the first substrate 10 includes multiple first sub-electrodes 131, and all the first sub-electrodes 131 may be arranged in the same film structure, that is, all the first sub-electrodes 131 are arranged in the same layer.

At least part of the first sub-electrodes 131 can form capacitances with the correspondingly arranged second electrode 22 through the openings 121, and the capacitances include a capacitance between the first sub-electrode 131 and the droplet 41 that has an overlapping area with the orthographic projection of the first sub-electrode 131 on the plane where the first substrate 10 is located and further includes a capacitance formed between the droplet 41 and the second electrode 22. The changes and sizes of the capacitances between the first sub-electrode 131 and the correspondingly arranged second electrode 22 are detected, to determine whether the droplet 41 exists at this position, and the size of the droplet 41 is detected through the sizes of the capacitances.

Figure 4:
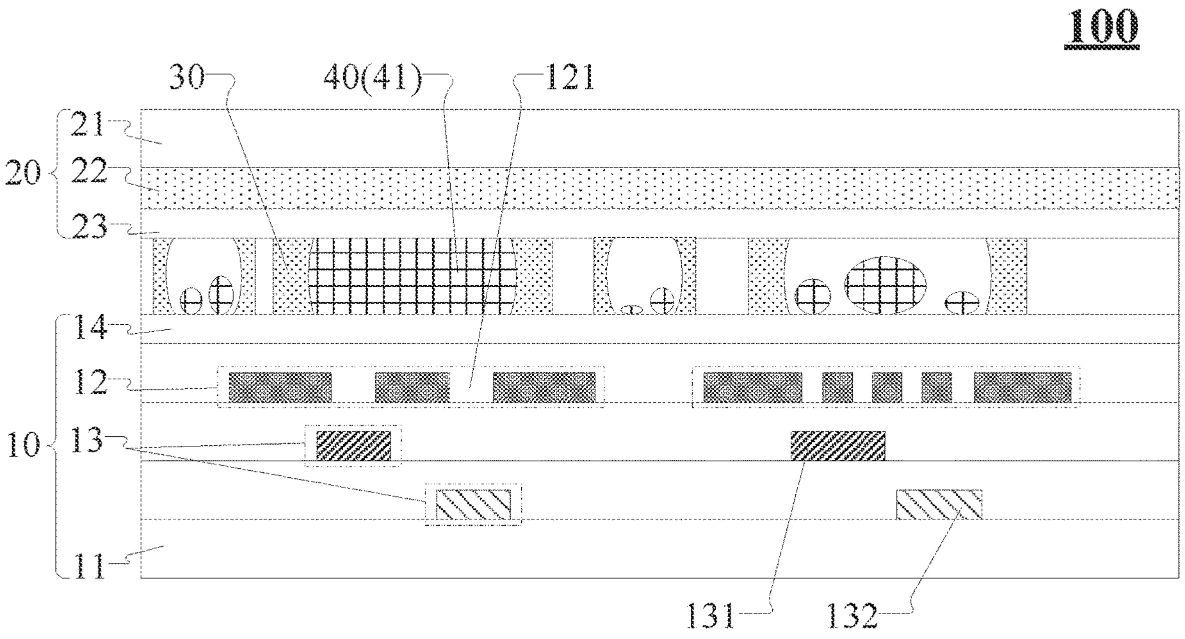
FIG. 4 is a partial sectional diagram of another microfluidic device according to an embodiment of the present application.

FIG. 4 is a partial sectional diagram of another microfluidic device according to an embodiment of the present application. Referring to FIG. 4, and the first electrode 13 further includes multiple second sub-electrodes 132, where the multiple first sub-electrodes 131 and the multiple second sub-electrodes 132 are arranged in different layers and insulated from each other.

On the basis that the first electrode 13 includes multiple first sub-electrodes 131 arranged in the same layer, the present application further provides one embodiment in which the first electrode 13 may further include multiple second sub-electrodes 132, where the multiple second sub-electrodes 132 may be arranged in the same film, and the multiple first sub-electrodes 131 and the multiple second sub-electrodes 132 are arranged in different layers. At the same time, in the present application, a film where the first sub-electrodes 131 are located and a film where the second sub-electrodes 132 are located are insulated from each other, to avoid the risk of electrical connection between the first sub-electrodes 131 and the second sub-electrodes 132, which is conducive to manufacturing the first sub-electrodes 131 and the second sub-electrodes 132.

In the case where the first electrode 13 includes both the first sub-electrodes 131 and the second sub-electrodes 132, the orthographic projection of the first sub-electrode 131 on the plane where the first substrate 10 is located does not overlap with an orthographic projection of the second sub-electrode 132 on the plane where the first substrate 10 is located. In this manner, the capacitance formed between the first sub-electrode 131 and the second electrode 22 and the capacitance formed between the second sub-electrode 132 and the second electrode 22 do not affect each other. That is, the first sub-electrode 131 is configured to form a capacitance with the correspondingly arranged second electrode 22, to detect the position and size of the droplet 41 that has an overlapping area with the orthographic projection of the first sub-electrode 131 on the plane where the first substrate 10 is located; and the second sub-electrode 132 is configured to form a capacitance with the correspondingly arranged second electrode 22, to detect the position and size of the droplet 41 that has an overlapping area with the orthographic projection of the second sub-electrode 132 on the plane where the first substrate 10 is located.

The present application provides one embodiment in which the orthographic projection of each opening 121 provided on the drive electrode 12 on the plane where the first substrate 10 is located has an overlapping area with only the orthographic projection of one first sub-electrode 131 or one second sub-electrode 132 on the plane where the first substrate 10 is located. In this manner, one opening 121 only corresponds to one first sub-electrode 131 or one second sub-electrode 132 and the droplet 41 that has an overlapping area with the orthographic projection of the opening 121 on the plane where the first substrate 10 is located may be accurately positioned. The preceding arrangement is only an embodiment provided in the present application, and the present application is not limited to this. A user may make corresponding arrangements and adjustments according to actual needs.

Figure 5:
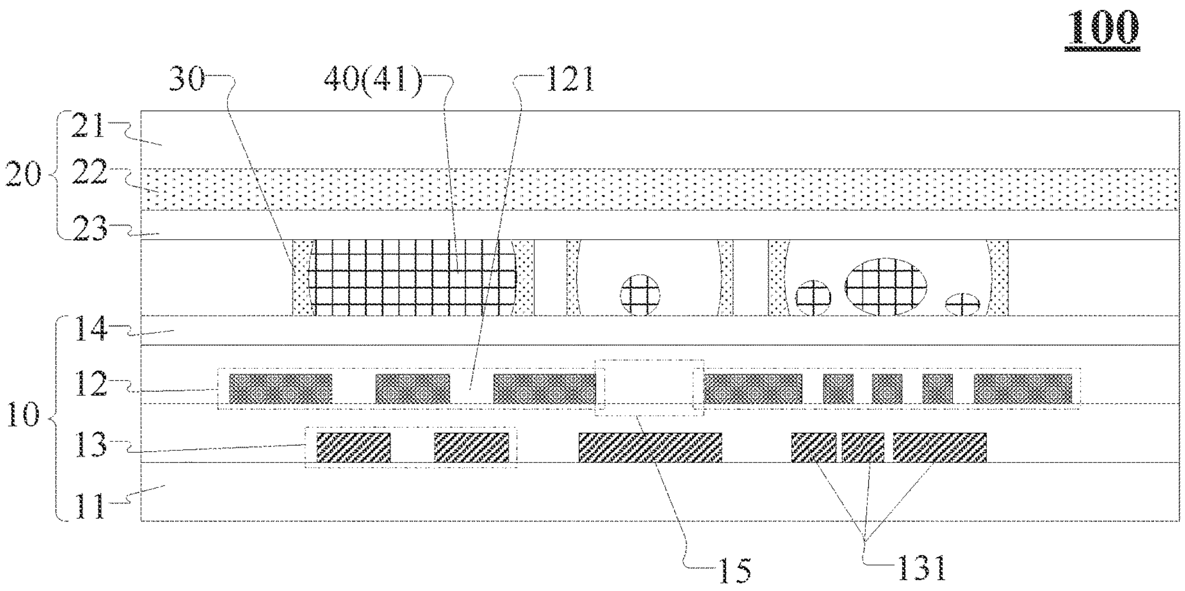
FIG. 5 is a partial sectional diagram of another microfluidic device according to an embodiment of the present application.

FIG. 5 is a partial sectional diagram of another microfluidic device according to an embodiment of the present application. Referring to FIGS. 2 and 5, and a first gap 15 is located between any two adjacent drive electrodes 12, and the orthographic projection of the first electrode 13 on the plane where the first substrate 10 is located covers at least part of an orthographic projection of the first gap 15 on the plane where the first substrate 10 is located.

In the case where the first substrate 10 includes multiple drive electrodes 12 arranged in an array, the present application provides one embodiment in which the first gap 15 is located between any two adjacent drive electrodes 12. In this case, the orthographic projection of the first electrode 13 in the first substrate 10 on the plane where the first substrate 10 is located covers at least part of the orthographic projection of the first gap 15 on the plane where the first substrate 10 is located and whether the droplet 41 exists in an orthographic projection region of the first gap 15 on the plane where the first substrate 10 is located is detected by using a capacitance formed between the first electrode 13 and the correspondingly arranged second electrode 22 through the first gap 15, and the size of the droplet 41 is detected through the size of the capacitance.

That is, the orthographic projection of the first electrode 13 on the plane where the first substrate 10 is located not only has an overlapping area with the orthographic projection of the opening 121 on the plane where the first substrate 10 is located, but also has an overlapping area with the orthographic projection of the first gap 15 between adjacent drive electrodes 12 on the plane where the first substrate 10 is located and the position and size of the droplet 41 that has overlapping areas with orthographic projection regions of the opening 121 and the first gap 15 on the plane where the first substrate 10 is located and is in the cavity 30 of the microfluidic device 100 are detected.

Figure 6:
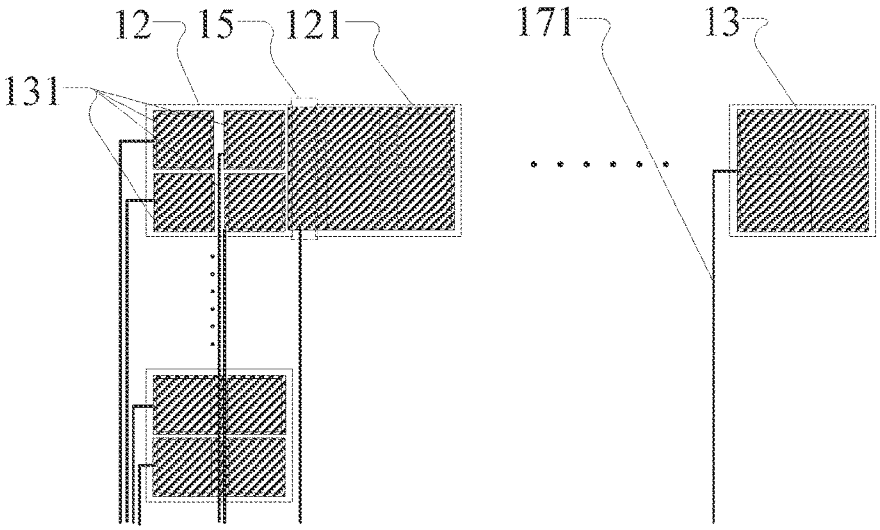
FIG. 6 is a top perspective diagram according to an embodiment of the present application.
Figure 7:
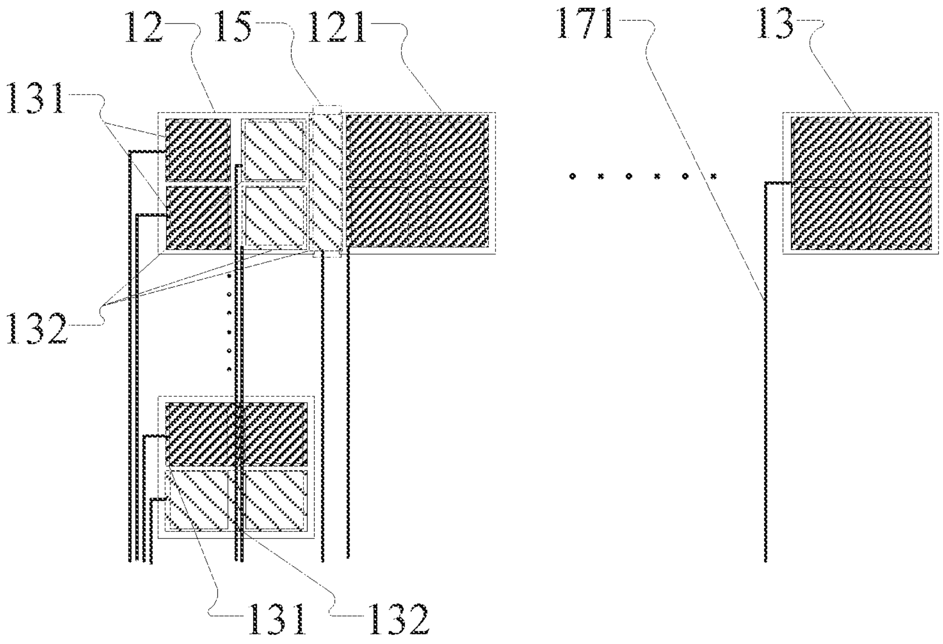
FIG. 7 is another top perspective diagram according to an embodiment of the present application.

FIG. 6 is a top perspective diagram according to an embodiment of the present application. FIG. 7 is another top perspective diagram according to an embodiment of the present application. Referring to FIGS. 4 to 7, and each first electrode 13 is electrically connected to at least one detection signal line 171, where the at least one detection signal line 171 transmits a detection signal to the first electrode 13.

Referring to top perspective diagrams of a right side in FIGS. 6 and 7, the microfluidic device 100 provided in the present application further includes multiple detection signal lines 171, each first electrode 13 is electrically connected to one detection signal line 171, and the detection signal line 171 is configured to be electrically connected to the first electrode 13 to transmit a detection signal to the first electrode 13. In this manner, the first electrode 13 is driven to generate a capacitance with the correspondingly arranged second electrode 22 through the opening 121 and/or the first gap 15 and the position and size of the droplet 41 that has overlapping areas with the orthographic projection regions of the opening 121 and the first gap 15 on the plane where the first substrate 10 is located are detected.

Referring to top perspective diagrams of left sides in FIGS. 6 and 7, the present application provides one manner in which each first electrode 13 is electrically connected to multiple detection signal lines 171; that is, in the case where the first electrode 13 only includes multiple first sub-electrodes 131, any first sub-electrode 131 is electrically connected to one detection signal line 171; and in the case where the first substrate 13 includes the first sub-electrodes 131 and the second sub-electrodes 132, each first sub-electrode 131 and each second sub-electrode 132 are each electrically connected to one detection signal line 171. In this manner, the size and position of the droplet 41 in a designated region in the microfluidic device 100 are detected and the waste of resources can be avoided. Through the detection, the droplet 41 is in one determined orthographic projection region of the first sub-electrode 131 or the second sub-electrode 132 on the plane where the first substrate 10 is located. In the case where it is detected that the capacitance at one position is different from the capacitance of a region where no droplet 41 exists normally, it means that the residual droplet 41 exists in a region corresponding to the capacitance.

With continued reference to FIGS. 6 and 7, the present application provides one manner in which each first electrode 13 is electrically connected to at least one detection signal line 171, that is, according to requirements, each first electrode 13 in some of the first electrodes 13 may be configured to be electrically connected to one detection signal line 171, and each first electrode 13 in some of the first electrodes 13 is configured to be electrically connected to multiple detection signal lines 171, achieving a mixed arrangement.

Figure 8:
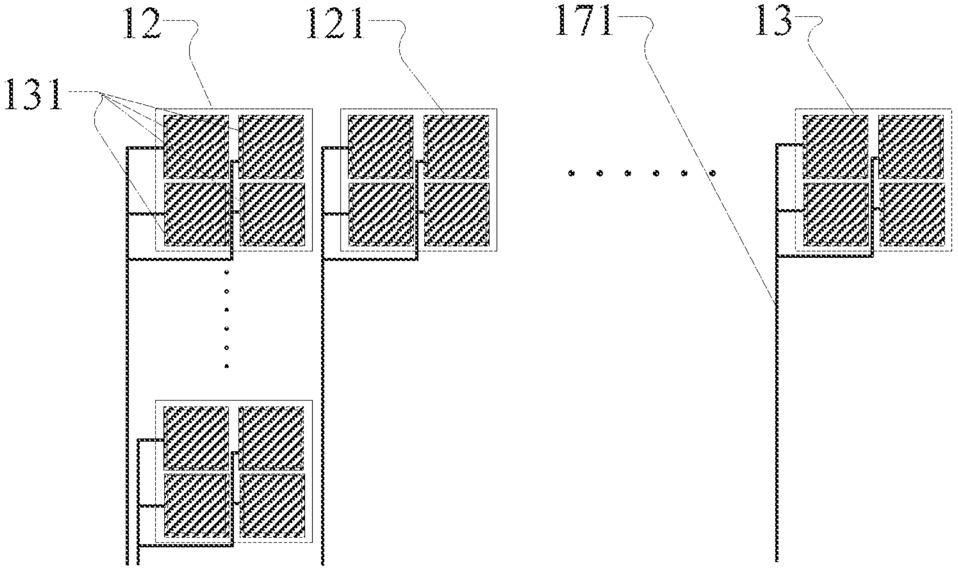
FIG. 8 is another top perspective diagram according to an embodiment of the present application.

FIG. 8 is another top perspective diagram according to an embodiment of the present application. Referring to FIGS. 5 and 8, and the orthographic projection of the drive electrode 12 on the plane where the first substrate 10 is located overlaps with orthographic projections of multiple first electrodes 13 on the plane where the first substrate 10 is located, the multiple first electrodes 13, whose orthographic projections on the plane where the first substrate 10 is located overlap with the orthographic projection of the same drive electrode 12 on the plane where the first substrate 10 is located, are electrically connected to the same detection signal line 171, and the detection signal line 171 transmits a detection signal to each of the first electrodes 13.

In the case where the first substrate 10 of the microfluidic device 100 includes multiple drive electrodes 12, the orthographic projection of each drive electrode 12 on the plane where the first substrate 10 is located has overlapping regions with the orthographic projections of the multiple first electrodes 13 on the plane where the first substrate 10 is located; and the multiple first electrodes 13, whose orthographic projection regions on the plane where the first substrate 10 is located have overlapping areas with the orthographic projection region of the same drive electrode 12 on the plane where the first substrate 10 is located, may be configured to be connected to the same detection signal line 171. In this manner, the size and position of the droplet 41 in a designated region in the microfluidic device 100 are detected; and through the detection, the droplet 41 is in one determined orthographic projection region of drive electrode 12 on the plane where the first substrate 10 is located, which is conducive to reducing the number of the arranged detection signal lines 171, to avoid occupy too much area of the microfluidic device 100, improving the number and density of electrodes in the microfluidic device 100.

Figure 9:
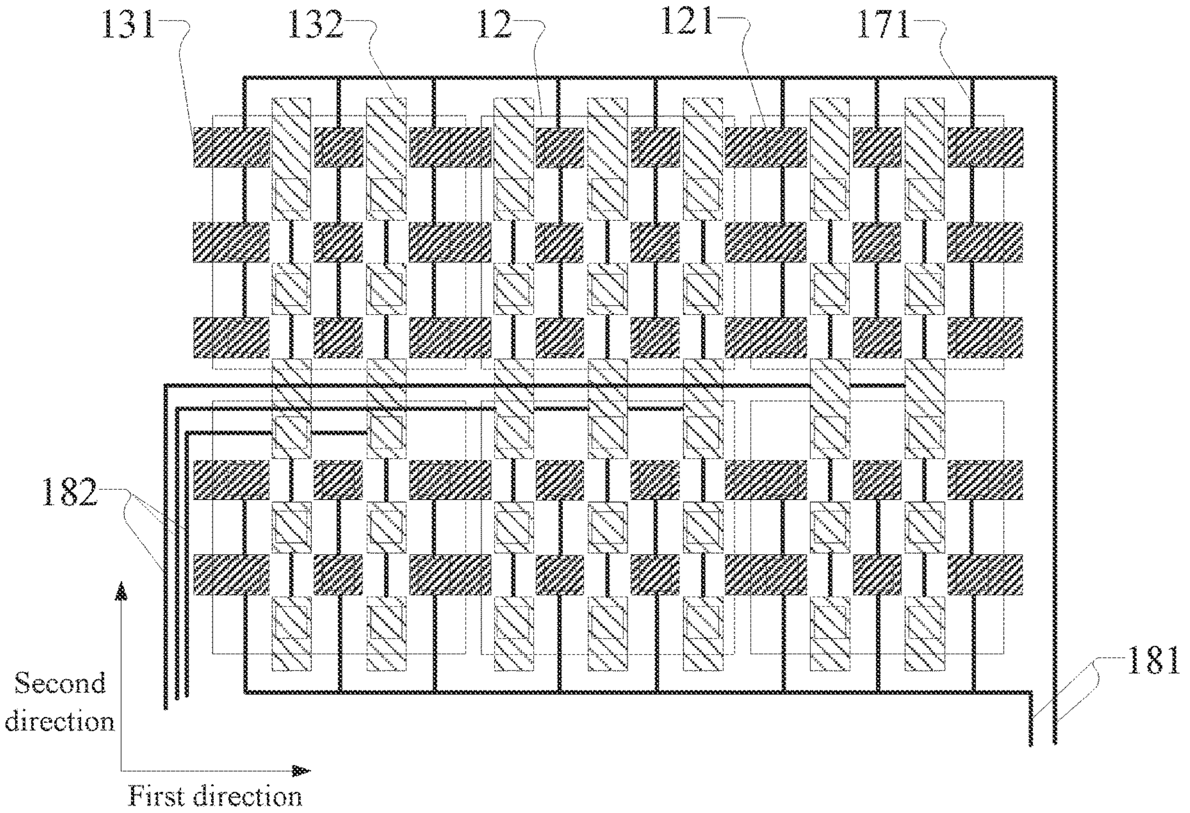
FIG. 9 is another top perspective diagram according to an embodiment of the present application.

FIG. 9 is another top perspective diagram according to an embodiment of the present application. Referring to FIGS. 4 and 9, and multiple first sub-electrodes 131 extend along a first direction and are arranged along a second direction, and multiple second sub-electrodes 132 extend along the second direction and are arranged along the first direction; where the first direction is parallel to a row direction of the array formed by multiple drive electrodes 12, and the second direction is parallel to a column direction of the array formed by the multiple drive electrodes 12.

When the first electrode 13 includes the first sub-electrodes 131 and the second sub-electrodes 132 arranged in layers, the present application provides one arrangement in which the multiple first sub-electrodes 131 extend along the first direction and are arranged along the second direction, and the multiple second sub-electrodes 132 extend along the second direction and are arranged along the first direction, where the first direction is perpendicular to the second direction.

The first electrode 13 provided in two layers (the first sub-electrodes 131 and the second sub-electrodes 132) may be configured to form row and column meshed lines respectively, and the first electrode 13 or the second electrode 22 corresponding to the drive electrodes 12 of each row/column may detect whether the droplet 41 exists on this row/column and detect the size of the droplet 41 existing in the cavity 30. After the first electrodes 13 arranged in rows/columns are sequentially numbered, detected droplets 41 may be encoded according to positions to show the positions of the droplets 41 in the microfluidic device 100.

Figure 10:
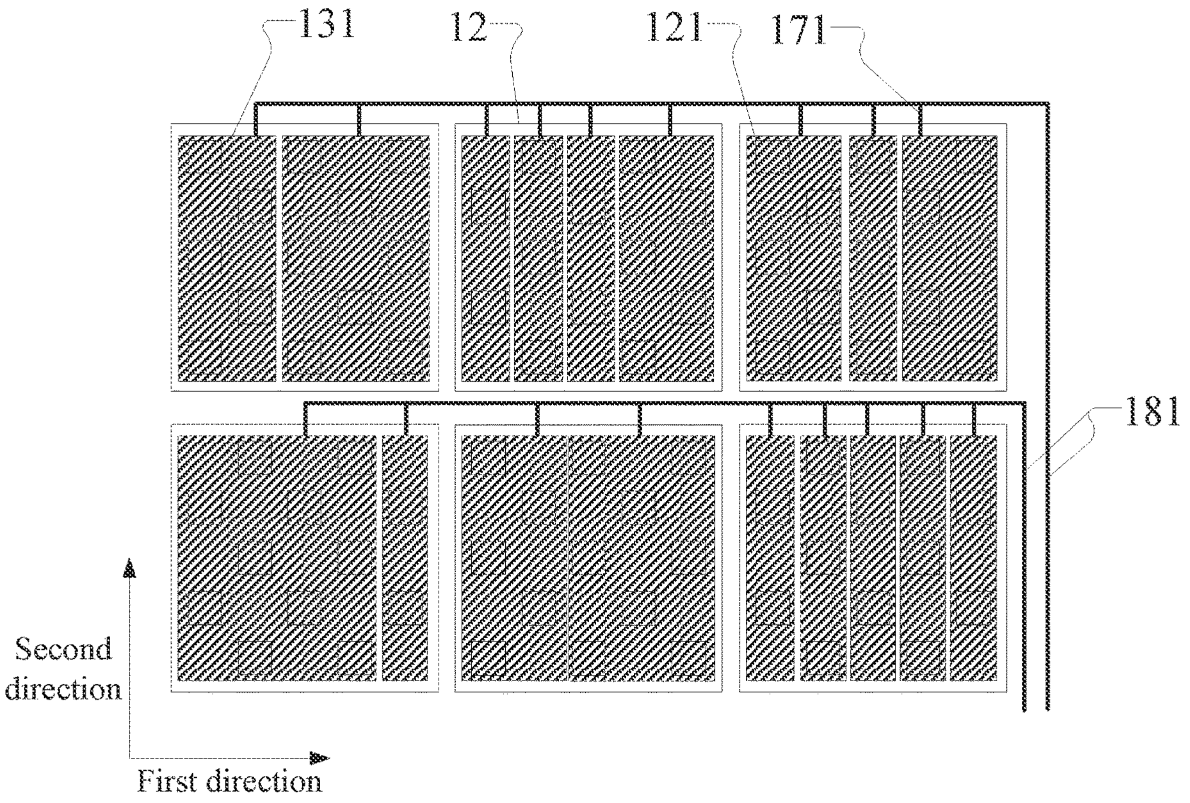
FIG. 10 is another top perspective diagram according to an embodiment of the present application.

FIG. 10 is another top perspective diagram according to an embodiment of the present application. Referring to FIGS. 5 and 10, and orthographic projections of a row of the drive electrodes 12 on the plane where the first substrate 10 is located overlap with orthographic projections of multiple first sub-electrodes 131 on the plane where the first substrate 10 is located; the multiple first sub-electrodes 131, whose orthographic projections on the plane where the first substrate 10 is located overlap with the orthographic projections of the row of the drive electrodes 12 on the plane where the first substrate 10 is located, are electrically connected to the same first detection signal bus 181, and the first detection signal bus 181 simultaneously transmits a first detection signal to each of the multiple first sub-electrodes 131.

The present application provides one embodiment in which the orthographic projections of a row of the drive electrodes 12 on the plane where the first substrate 10 is located overlap with the orthographic projections of the multiple first sub-electrodes 131 on the plane where the first substrate 10 is located, where the multiple first sub-electrodes 131, whose orthographic projections on the plane where the first substrate 10 is located overlap with the orthographic projections of the row of the drive electrodes 12 on the plane where the first substrate 10 is located, may be configured to be electrically connected to the same first detection signal bus 181, that is, the first detection signal bus 181 may simultaneously transmit the first detection signal to each of the multiple first sub-electrodes 131 corresponding to this row of drive electrodes 12.

In the case where the first electrode 13 only includes multiple first sub-electrodes 131 arranged in the same layer, that is, the detection signal lines 171 that are respectively electrically connected to the multiple first sub-electrodes 131 corresponding to each row of the drive electrodes 12 are connected at tail ends, and the detection signals are simultaneously provided through one first detection signal bus 181. The first sub-electrodes 131 corresponding to each row of the drive electrodes 12 may detect whether the droplet 41 exists in a region where an orthographic projection on this row is located and detect the size of the droplet 41 existing in the cavity 30, and the position and corresponding size of the droplet 41 are comprehensively determined through row signals, accurately showing the position of the detected droplet 41 in the microfluidic device 100.

Referring to FIGS. 4 and 9, and orthographic projections of a column of the drive electrodes 12 on the plane where the first substrate 10 is located overlap with orthographic projections of multiple second sub-electrodes 132 on the plane where the first substrate 10 is located; the multiple second sub-electrodes 132, whose orthographic projections on the plane where the first substrate 10 is located overlap with the orthographic projections of the column of the drive electrodes 12 on the plane where the first substrate 10 is located, are electrically connected to the same second detection signal bus 182, and the second detection signal bus 182 simultaneously transmits a second detection signal to each of the multiple second sub-electrodes 132.

The present application provides one embodiment in which in the case where the first electrode 13 includes the first sub-electrodes 131 and the second sub-electrodes 132 arranged in layers and the first sub-electrodes 131 and the second sub-electrodes 132 are arranged in rows and columns, in the present application, while the multiple first sub-electrodes 131, whose orthographic projections on the plane where the first substrate 10 is located overlap with the orthographic projections of one row of the drive electrodes 12 on the plane where the first substrate 10 is located, are configured to be all electrically connected to the same first detection signal bus 181, the multiple second sub-electrodes 132, whose orthographic projections on the plane where the first substrate 10 is located overlap with the orthographic projections of one column of the drive electrodes 12 on the plane where the first substrate 10 is located, are configured to be all electrically connected to the same second detection signal bus 182. In this case, the first detection signal bus 181 simultaneously transmits the first detection signal to each of the multiple first sub-electrodes 131, and the second detection signal bus 182 simultaneously transmits the second detection signal to each of the multiple second sub-electrodes 132.

That is, the detection signal lines 171 that are respectively electrically connected to the multiple first sub-electrodes 131 corresponding to each row of the drive electrodes 12 are connected at tail ends, and the detection signals are simultaneously provided through one first detection signal bus 181; the detection signal lines 171 that are respectively electrically connected to the multiple second sub-electrodes 132 corresponding to each column of the drive electrodes 12 are connected at tail ends, and the detection signals are simultaneously provided through one second detection signal bus 182. The first electrode 13 corresponding to the drive electrodes 12 of each row/column may detect whether the droplet 41 exists on this row/column and detect the size of the droplet 41 existing in the cavity 30, and the position and corresponding size of the droplet 41 are comprehensively determined through the row/column signals. That is, M+N detection signal buses (M first detection signal buses 181 and N second detection signal buses 182) may be used for detecting the droplet 41 on the drive electrodes 12 of an M*N array, accurately showing the position of the detected droplet 41 in the microfluidic device 100.

Figure 11:
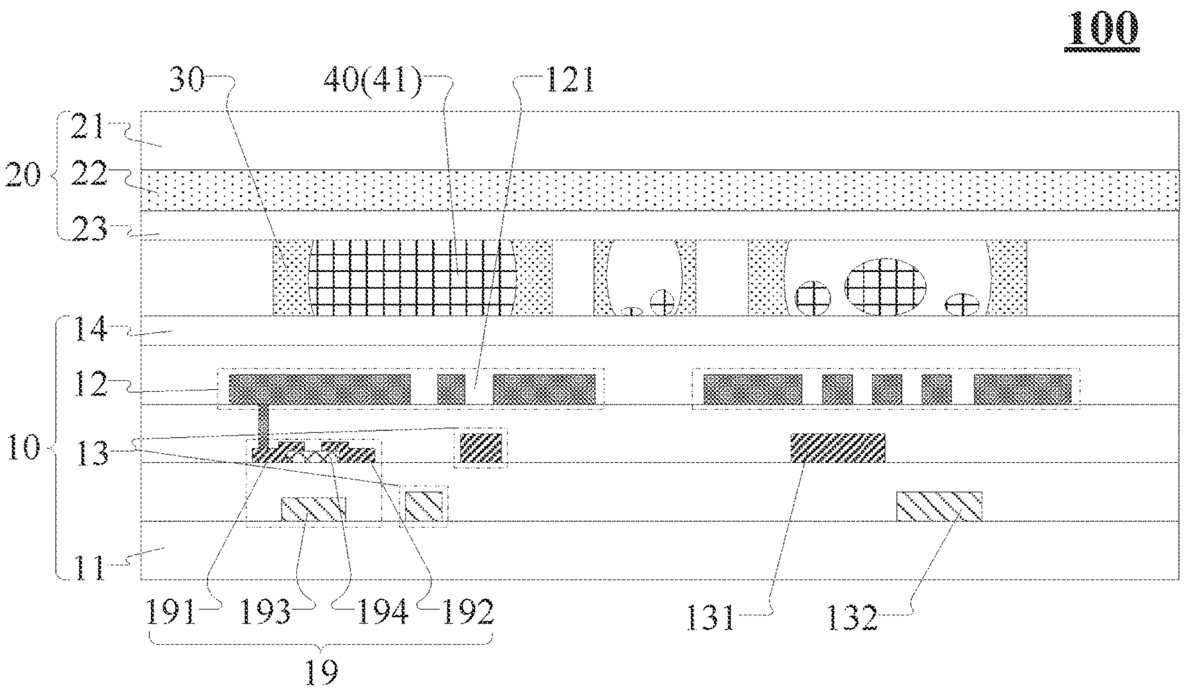
FIG. 11 is a partial sectional diagram of another microfluidic device according to an embodiment of the present application.

FIG. 11 is a partial sectional diagram of another microfluidic device according to an embodiment of the present application. Referring to FIG. 11, and the microfluidic device further includes multiple transistors 19 in a one-to-one correspondence with the multiple drive electrodes 12, where the transistors 19 are configured to load drive voltage signals respectively to the drive electrodes 12, and different drive voltage signals are applied to adjacent drive electrodes 12 to drive the liquid 40 to move. Only one transistor 19 corresponding to one drive electrode 12 is shown in FIG. 11.

In the microfluidic device 100 provided in the present application, multiple transistors 19 electrically connected to the multiple drive electrodes 12 in a one-to-one correspondence may further be provided. The transistors 19 are configured to load drive voltage signals to the drive electrodes 12, that is, the transistors 19 serve as switches for controlling whether or not to apply the drive voltage signals to the drive electrodes 12. In the present application, different drive voltage signals may be applied to adjacent drive electrodes 12 and the liquid 40 in the microfluidic device 100 is driven to move through an electric field formed between the adjacent drive electrodes 12.

With continued reference to FIG. 11, and the multiple transistors 19 are disposed on a side of the multiple drive electrodes 12 facing away from the second substrate 20; and an orthographic projection of the transistor 19 on the plane where the first substrate 10 is located overlaps with an orthographic projection of the drive electrode 12 corresponding to this transistor 19 on the plane where the first substrate 10 is located.

In the case where the microfluidic device 100 includes the transistors 19, the present application provides one arrangement in which the multiple transistors 19 are arranged on a side of the multiple drive electrodes 12 facing away from the second substrate 20, and in this case, the orthographic projection of the transistor 19 on the plane where the first substrate 10 is located overlaps with the orthographic projection of the drive electrode 12 corresponding to this transistor 19 on the plane where the first substrate 10 is located, that is, an orthographic projection of at least part of a film structure forming the transistors 19 on the plane where the first substrate 10 is located can overlap with the orthographic projection of the drive electrode 12 corresponding to this transistor 19 on the plane where the first substrate 10 is located. In the present application, the transistors 19 are arranged below the drive electrodes 12 and not arranged in regions corresponding to first gaps 15 or the openings 121 and the drive electrodes 12 may shield parasitic capacitances caused by the transistors 19, effectively improving the positioning accuracy of the droplet 41.

With continued reference to FIG. 11, and each transistor 19 includes a gate 193, a first pole 191, and a second pole 192; the first pole 191 is electrically connected to the drive electrode 12 corresponding to this transistor 19; the first sub-electrodes 131 are disposed on a side of the second sub-electrodes 132 facing the second substrate 20, the gate 193 and the second sub-electrodes 132 are arranged in the same layer, and the first pole 191 and the second pole 192 are arranged in the same layer as the first sub-electrodes 131.

The present application provides one embodiment. In the case where the number of drive electrodes 12 in the microfluidic device 100 is relatively large and the structure is relatively complex, the microfluidic device 100 may be configured to include scan lines, data lines, and the transistors 19 through which the microfluidic device 100 operates in an active driving manner similar to that of a display panel. Each drive electrode 12 is similar to one sub-pixel in the display panel, the scan lines and the data lines are used for scanning, and the active driving of the drive electrodes 12 is achieved by using the on and off of the transistors 19. The transistor 19 includes the gate 193, the first pole 191, and the second pole 192 (a source electrode and a drain electrode), the first pole 191 may be electrically connected to the drive electrode 12, the second pole 192 is electrically connected to the data line, and the gate 193 is electrically connected to the scan line. The transistors 19 may be thin film transistors, for example, thin film transistors formed by using an amorphous silicon material, a polysilicon material, or a metal oxide material as an active layer 194.

The present application provides an arrangement of the transistors 19 in which in the case where the first electrode 13 includes the first sub-electrodes 131 and the second sub-electrodes 132 arranged in layers, the first sub-electrodes 131 may be disposed on a side of the second sub-electrodes 132 facing the second substrate 20, the gate 193 of the transistor 19 and the second sub-electrodes 132 are arranged in the same layer, and the first pole 191 and the second pole 192 are arranged in the same layer as the first sub-electrodes 131, to avoid the increase in the thickness of the film of the microfluidic device 100 when the transistors 19 are arranged, which is also conducive to simplifying the manufacturing process of the microfluidic device 100.

With continue reference to FIG. 11, and at least part of the second sub-electrodes 132 are used as both the second sub-electrode 132 the gate 193, and at least part of the first sub-electrodes 131 are used as both the first sub-electrode 131 and the first pole 191 and the second pole 192.

In the case where the gate 193 in the transistor 19 and the second sub-electrodes 132 are arranged in the same layer, and the first pole 191 and the second pole 192 in the transistor 19 are arranged in the same layer as the first sub-electrodes 131, the present application further provides one embodiment described below. At least part of the manufactured second sub-electrodes 132 are reused as the gate 193 of the transistor 19, and at least part of the manufactured first sub-electrodes 131 are reused as the first pole 191 and the second pole 192 of the transistor 19. In this manner, not only it is ensured that the thickness of the film of the microfluidic device 100 is not increased, but also the manufacturing process of the film and the manufactured structure can be reused, simplifying the manufacturing process of the microfluidic device 100.

Referring to FIGS. 1 and 2 and FIGS. 6 to 8, and any drive electrode 12 includes multiple openings 121 that are evenly distributed.

In the microfluidic device 100 provided in the present application, at least part of the drive electrodes 12 are provided with some openings 121, and the present application provides an arrangement of the openings 121 on the drive electrodes 12 as follows: any drive electrode 12 includes multiple openings 121 that are evenly distributed and a detection effect of the droplet 41 in the region where the drive electrodes 12 are located is more uniform and accurate, and the problem that some droplets 41 cannot be detected due to the uneven setting of the openings 121 is avoided.

On this basis, in the present application, the openings 121 provided on different drive electrodes 12 are arranged in the same arrangement and the openings 121 in the entire microfluidic device 100 are all evenly arranged, enhancing the detection effect of the droplet 41 in the region where the drive electrodes 12 are located, which is also conducive to simplifying the manufacturing process of the openings 121.

Referring to FIGS. 9 and 10 in conjunction with FIGS. 4 and 5, and two adjacent rows of openings 121 are arranged along the first direction in a staggered manner; where the first direction is parallel to a row direction of the array formed by the multiple drive electrodes 12.

In the present application, in addition to the neatly arranged determinant array of the openings 121 opened on the drive electrodes 12 shown in FIGS. 1 and 2 and FIGS. 6 to 8, the present application further provides one embodiment. As shown in FIGS. 9 and 10, two adjacent rows of openings 121 are arranged in a staggered manner and the detection effect of the residual droplet 41 in the microfluidic device 100 is better.

Figure 12:
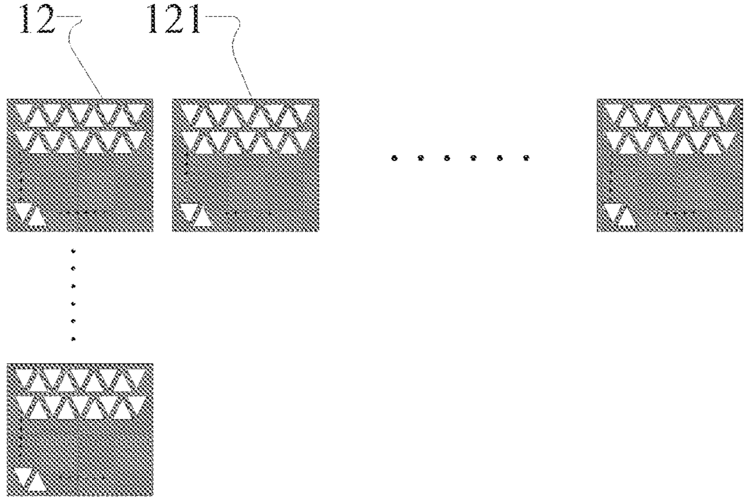
FIG. 12 is a top diagram of another drive electrode according to an embodiment of the present application.

FIG. 12 is a top diagram of another drive electrode according to an embodiment of the present application. Referring to FIG. 12 in conjunction with FIG. 1, and the orthographic projection of the opening 121 on the plane where the first substrate 10 is located is a rectangle, a circle, an ellipse or a triangle.

The present application provides some optional arrangements for the shape of the opening 121 opened on the drive electrode 12. The orthographic projection of the opening 121 on the plane where the first substrate 10 is located is a rectangle, a circle, an ellipse or a triangle.

For example, as shown in FIG. 12, and the shape of the opening 121 in the present application may be a triangle. In this case, the openings 121 in a row may all be in a shape of an equilateral triangle, the openings 121 in the next adjacent row are all inverted triangles, and such alternate arrangement is applied and the number of the openings 121 correspondingly arranged on one drive electrode 12 is larger, and thus the detection effect of the first electrode 13 and the second electrode 22 through the openings 121 for the residual droplet 41 is better.

In addition, the present application also does not limit the openings 121 on one drive electrode 12 to only have the same shape and does not limit the sizes of the openings 121.

In one embodiment, the second electrode 22 is a planar electrode, a block electrode or a strip electrode.

The present application does not limit the set shapes of the drive electrode 12, the first electrode 13, and the second electrode 22. The drive electrode 12, the first electrode 13, and the second electrode 22 may be configured to be the strip electrode, the block electrode, the planar electrode and the like, as long as it can be ensured that the first electrode 13 and the second electrode 22 can detect the residual droplet 41 in the cavity 30 through the openings 121 opened on the drive electrode 12.

In one embodiment, the first electrode 13 is a touch electrode and the second electrode 22 is a common electrode; or the first electrode 13 is a common electrode and the second electrode 22 is a touch electrode.

In a microfluidic electrode provided in the present application, the first electrode 13 may be the touch electrode, for example, a touch sensing electrode configured to sense the size and position of the residual droplet 41 in the cavity 30; the second electrode 22 may be the common electrode configured to form a capacitance with the first electrode 13 through the openings 121, and the size and position of the residual droplet 41 in at least part of the cavity 30 are obtained through the change of the capacitance.

In one embodiment, in the microfluidic electrode provided in the present application, the second electrode 22 may be the touch electrode, for example, a touch sensing electrode configured to sense the size and position of the residual droplet 41 in the cavity 30; the first electrode 13 may be the common electrode configured to form a capacitance with the second electrode 22 through the openings 121, and the size and position of the residual droplet 41 in at least part of the cavity 30 are obtained through the change of the capacitance.

It can be seen from the preceding embodiments that the microfluidic device provided in the present application achieves at least the effects described below.

In the present application, at least one opening is opened on at least one drive electrode in the first substrate in the microfluidic device, and the first electrode is disposed on a side of the drive electrode in the first substrate farther from the second substrate; the change of the capacitance between the first electrode and the second electrode in the second substrate through the opening is used for detecting the size and accurate position of the droplet existing on an orthographic projection surface of the drive electrode, detecting the residual droplet in the microfluidic device.

What is claimed is:

1. A microfluidic device, comprising a first substrate and a second substrate disposed opposite to each other, wherein a cavity is formed between the first substrate and the second substrate and configured to accommodate liquid;

the first substrate comprises a plurality of drive electrodes and a plurality of first electrodes, the plurality of drive electrodes are disposed on a side of the plurality of first electrodes facing the second substrate, and the plurality of drive electrodes are arranged in an array; wherein the plurality of drive electrodes are configured to drive movement of the liquid in the cavity;

at least one of the plurality of drive electrodes comprises at least one opening, and the at least one opening, along a direction perpendicular to a plane where the first substrate is located, penetrates the at least one of the plurality of drive electrodes where the at least one opening is located; and an orthographic projection of at least one of the plurality of first electrodes on the plane where the first substrate is located covers at least an orthographic projection of one of the at least one opening on the plane where the first substrate is located; and the second substrate comprises at least one second electrode, and an orthographic projection of the at least one second electrode on the plane where the first substrate is located at least partially overlaps with an orthographic projection of the plurality of first electrodes on the plane where the first substrate is located;

wherein the at least one opening is configured to form a capacitance between a respective one of the plurality of first electrodes and the at least one second electrode to detect a size and a location of a residual droplet in the cavity.

2. The microfluidic device of claim 1, wherein one of the plurality of first electrodes comprises a plurality of first sub-electrodes arranged in a same layer.

3. The microfluidic device of claim 2, wherein one of the plurality of first electrodes further comprises a plurality of second sub-electrodes, wherein the plurality of first sub-electrodes and the plurality of second sub-electrodes are arranged in different layers and insulated from each other.

4. The microfluidic device of claim 1, further comprising a first gap located between two adjacent ones of the plurality of drive electrodes, and the orthographic projection of one of the plurality of first electrodes on the plane where the first substrate is located covers at least part of an orthographic projection of the first gap on the plane where the first substrate is located.

5. The microfluidic device of claim 1, wherein each of the plurality of first electrodes is electrically connected to at least one detection signal line, and detection signal lines are configured to transmit a detection signal to a respective one of the plurality of first electrodes.

6. The microfluidic device of claim 1, wherein an orthographic projection of one of the plurality of drive electrodes on the plane where the first substrate is located overlaps with orthographic projections of first electrodes from the plurality of first electrodes on the plane where the first substrate is located;

wherein the first electrodes from the plurality of first electrodes, whose orthographic projections on the plane where the first substrate is located overlap with an orthographic projection of a same one of the plurality of drive electrodes on the plane where the first substrate is located, are electrically connected to a same detection signal line, and the same detection signal line is configured to transmit a detection signal to each of the first electrodes from the plurality of first electrodes corresponding to the same one of the plurality of drive electrodes.

7. The microfluidic device of claim 3, wherein the plurality of first sub-electrodes extend along a first direction and are arranged along a second direction, and the plurality of second sub-electrodes extend along the second direction and are arranged along the first direction; wherein the first direction is parallel to a row direction of the array formed by the plurality of drive electrodes, and the second direction is parallel to a column direction of the array formed by the plurality of drive electrodes.

8. The microfluidic device of claim 7, wherein orthographic projections of a row of the plurality of drive electrodes on the plane where the first substrate is located overlap with orthographic projections of the plurality of first sub-electrodes on the plane where the first substrate is located; and the plurality of first sub-electrodes, whose orthographic projections on the plane where the first substrate is located overlap with the orthographic projections of the row of the plurality of drive electrodes on the plane where the first substrate is located, are electrically connected to a same first detection signal bus, and the same first detection signal bus is configured to simultaneously transmit a first detection signal to each of the plurality of first sub-electrodes corresponding to the row of the plurality of drive electrodes.

9. The microfluidic device of claim 7, wherein orthographic projections of a column of the plurality of drive electrodes on the plane where the first substrate is located overlap with orthographic projections of the plurality of second sub-electrodes on the plane where the first substrate is located; and the plurality of second sub-electrodes, whose orthographic projections on the plane where the first substrate is located overlap with the orthographic projections of the column of the plurality of drive electrodes on the plane where the first substrate is located, are electrically connected to a same second detection signal bus, and the same second detection signal bus is configured to simultaneously transmit a second detection signal to each of the plurality of second sub-electrodes corresponding to the column of the plurality of drive electrodes.

10. The microfluidic device of claim 3, further comprising a plurality of transistors in a one-to-one correspondence with the plurality of drive electrodes, wherein the plurality of transistors are configured to load drive voltage signals respectively to the plurality of drive electrodes corresponding to the plurality of transistors.

11. The microfluidic device of claim 10, wherein the plurality of transistors are disposed on a side of the plurality of drive electrodes facing away from the second substrate; and an orthographic projection of one of the plurality of transistors on the plane where the first substrate is located overlaps with an orthographic projection of a respective one of the plurality of drive electrodes on the plane where the first substrate is located.

12. The microfluidic device of claim 11, wherein each of the plurality of transistors comprises a gate, a source electrode, and a drain electrode; wherein the source electrode is electrically connected to a respective one of the plurality of drive electrodes; and the plurality of first sub-electrodes are disposed on a side of the plurality of second sub-electrodes facing the second substrate, the gate and the plurality of second sub-electrodes are arranged in a same layer, and the source electrode and the drain electrode are disposed in a same layer as the plurality of first sub-electrodes.

13. The microfluidic device of claim 12, wherein at least part of the plurality of second sub-electrodes are configured to be used as both a second sub-electrode and the gate, at least part of the plurality of first sub-electrodes are configured to be used as both a first sub-electrode and the source electrode, and at least another part of the plurality of first sub-electrodes are configured to be used as both the first sub-electrode and the drain electrode.

14. The microfluidic device of claim 1, wherein one of the plurality of drive electrodes comprises a plurality of openings that are evenly distributed.

15. The microfluidic device of claim 14, wherein two adjacent rows of the plurality of openings are arranged along a first direction in a staggered manner;

wherein the first direction is parallel to a row direction of the array formed by the plurality of drive electrodes.

16. The microfluidic device of claim 1, wherein an orthographic projection of the at least one opening on the plane where the first substrate is located is a rectangle, a circle, an ellipse or a triangle.

17. The microfluidic device of claim 1, wherein the at least one second electrode is a planar electrode, a block electrode or a strip electrode.

18. The microfluidic device of claim 1, wherein the plurality of first electrodes are touch electrodes and the at least one second electrode is a common electrode; or the plurality of first electrodes are common electrodes and the at least one second electrode is a touch electrode.

19. The microfluidic device of claim 2, wherein at least part of the plurality of first sub-electrodes is configured to form capacitances with the at least one second electrode through a respective opening of the at least one opening, and the capacitances include a capacitance between a respective first sub-electrode of the at least part of the plurality of first sub-electrodes and a droplet that has an overlapping area with an orthographic projection of the respective first sub-electrode on the plane where the first substrate is located and a capacitance formed between the droplet and the at least one second electrode.

* * * * *